United States Patent
Gross et al.

(10) Patent No.: US 9,738,764 B2
(45) Date of Patent: Aug. 22, 2017

(54) METHODS, SYSTEMS AND APPARATUSES FOR CURING EPOXY-CONTAINING PREPREG COMPOSITE ASSEMBLY

(71) Applicant: THE BOEING COMPANY, Chicago, IL (US)

(72) Inventors: Gwen M Gross, Redmond, WA (US); Michael P Thompson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/987,988

(22) Filed: Jan. 5, 2016

(65) Prior Publication Data

US 2017/0190855 A1 Jul. 6, 2017

(51) Int. Cl.
C08J 5/24 (2006.01)

(52) U.S. Cl.
CPC .......... *C08J 5/24* (2013.01); *C08J 2363/00* (2013.01); *C08J 2363/02* (2013.01); *C08J 2363/04* (2013.01); *C08J 2363/06* (2013.01)

(58) Field of Classification Search
CPC .................... C08L 63/00; C08J 5/24
See application file for complete search history.

(56) References Cited

U.S. PATENT DOCUMENTS

| | | | |
|---|---|---|---|
| 2,886,402 A | 5/1959 | Coe | |
| 3,972,765 A * | 8/1976 | Kondo | C03C 25/36 156/315 |
| 4,049,851 A * | 9/1977 | Greif | D06M 13/11 156/181 |
| 4,663,231 A * | 5/1987 | Girgis | D01F 11/14 428/375 |
| 4,956,197 A * | 9/1990 | Babu | H05K 3/381 216/17 |
| 5,736,196 A | 4/1998 | Decker et al. | |
| 2001/0042593 A1* | 11/2001 | Zhou | B29D 24/005 156/307.1 |
| 2008/0118427 A1* | 5/2008 | Leon y Leon | D01F 9/225 423/447.2 |

* cited by examiner

*Primary Examiner* — Megan McCulley
(74) *Attorney, Agent, or Firm* — Coats & Bennett, PLLC

(57) ABSTRACT

Methods and systems and components made according to the methods and systems, are disclosed relating to improved curing methods for epoxy resin-containing composite prepreg materials, wherein the composite prepreg materials are exposed to a flow of ammonia-containing compounds to fully cure the composite prepreg materials at substantially ambient temperatures and pressures.

18 Claims, 8 Drawing Sheets

METHODS, SYSTEMS AND APPARATUSES FOR CURING EPOXY-CONTAINING PREPREG COMPOSITE ASSEMBLY

TECHNOLOGICAL FIELD

The present disclosure generally relates to the field of composite assemblies. More particularly, the present disclosure relates to the field of curing composite assemblies comprising epoxy-containing prepreg components.

BACKGROUND

Composite materials, including aerospace-grade composite materials comprise layers of impregnated composite material, or prepregs that, in turn comprise resins or blends of resin-containing compounds, including epoxy monomers including, without limitation, multifunctional epoxy monomer(s) and a bi-functional amine monomer(s). The prepreg layers must be cured to achieve a useable finished composite material. To achieve a reasonable rate of reaction, and to therefore effect a cure within a reasonable amount of time, the prepregs are commonly subjected to elevated temperatures and pressures during curing.

For example, current aerospace fiber/epoxy prepreg materials comprise long-chain epoxy backbone molecules and long-chain amine curative molecules. To properly cure composite parts, accepted cure techniques require high temperature ranging from about 250° F. to about 355° F. (oven cure). Other accepted cure techniques require both high temperature ranging from about 250° F. to about 355° F. and high pressure ranging from about 45 psi to about 100 psi (autoclave cure). Ovens and autoclaves used to produce the composite material curing conditions (high temperatures and high pressures) are expensive, and take up a considerable footprint in the composite manufacturing process, adding to the overall production cost of the component parts and finished product. In addition, the size (dimension) of the parts able to be cured according to known curing methods is necessarily limited by the physical dimensions of the oven or autoclave available to be used in the curing process. Still further, tooling used to shape the composite parts must also withstand the high temperature and/or high pressure conditions. In addition, the tooling ideally must match the coefficient of thermal expansion of the prepreg material, further complicating the process and often adding a commensurate processing expense, while restricting the availability of otherwise desirable tooling materials.

An efficient and cost-effective curing system that can be conducted at lower pressures and temperatures would be useful, cost-effective and highly advantageous.

BRIEF SUMMARY

The present disclosure relates to methods, systems and apparatuses for curing epoxy resin-containing prepreg composite materials at ambient, or room, temperatures and ambient pressure.

According to one aspect of the disclosure, methods are disclosed for curing an epoxy-containing prepreg assembly comprising positioning an epoxy-containing prepreg assembly in an enclosed environment, with the enclosed environment comprising an inlet; delivering a flow of an ammonia-containing compound to the enclosed environment and to a predetermined concentration via the inlet; maintaining the flow of the ammonia-containing compound to the enclosed environment at the predetermined concentration for a predetermined duration, and curing the epoxy-containing prepreg assembly, wherein the prepreg in the enclosed environment is maintained at a substantially ambient temperature and at a substantially ambient pressure.

In a further aspect, the ammonia-containing compound is delivered to the enclosed environment in a gaseous state.

In another aspect, the ammonia-containing compound is delivered to the enclosed environment as a vapor.

In a further aspect, the ammonia-containing compound may be derived from, without limitation, any compound capable of generating volatile ammonia such as ammonia carbonate, or pure ammonia, such as that supplied under pressure from a compressed gas cylinder.

In yet another aspect, the epoxy-containing prepreg comprises an epoxy-containing compound including, without limitation, digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

According to another aspect, the epoxy-containing prepreg has a viscosity ranging from about 60,000 poise to about 1000 poise, depending upon the temperature of the prepreg. For example, although not limiting in terms of useful prepregs contemplated herein, at room temperature, useful epoxy-containing prepregs generally have a viscosity of about 60,000 poise, and observe a change in viscosity approximating the following:

100° F.: 22,000 poise
150° F.: 1000 poise
200° F.: 93 poise
250° F.: 16 poise
300° F.: 16 poise
350° F.: 165,000 poise (resin is mostly cured).

In a further aspect, the enclosed environment comprises an outlet.

In another aspect, the outlet is in communication with a vacuum.

In a further aspect, the substantially ambient temperature is equivalent to the prevailing room temperature.

In another aspect, the room temperature ranges from about 60° F. to about 100° F.

In another aspect, the room temperature ranges from about 70° F. to about 85° F.

In yet another aspect, ambient pressure ranges from about 14 psi to about 16 psi.

In a further aspect, the present disclosure is directed to a system for curing an epoxy-containing prepreg assembly, with the assembly comprising an epoxy-containing prepreg having a viscosity ranging from about 60,000 poise to 1000 poise; an enclosed environment dimensioned to house the epoxy-containing prepreg assembly, with the enclosed environment comprising an inlet; and an amount of ammonia-containing compound delivered to the enclosed environment to a predetermined concentration via the inlet, wherein the ammonia-containing compound cures the epoxy-containing prepreg assembly at a substantially ambient temperature and at a substantially ambient pressure.

In a further aspect, the enclosed environment comprises an outlet.

In yet another aspect, the present disclosure is directed to a cured epoxy-containing prepreg assembly made according to a method comprising the steps of positioning an epoxy-containing prepreg assembly in an enclosed environment, with the enclosed environment comprising an inlet; delivering a flow of an ammonia-containing compound to the enclosed environment to a predetermined concentration via the inlet; maintaining the flow of the ammonia-containing compound to the enclosed environment at the predetermined concentration for a predetermined duration, and curing the epoxy-containing prepreg assembly, wherein the prepreg in the enclosed environment is maintained at a substantially ambient temperature and at a substantially ambient temperature.

In a still further aspect, the present disclosure is directed to a structure comprising an epoxy-containing prepreg assembly made according to a method comprising the steps of positioning an epoxy-containing prepreg assembly in an enclosed environment, with the enclosed environment comprising an inlet; delivering a flow of an ammonia-containing compound to the enclosed environment to a predetermined concentration via the inlet; maintaining the flow of the ammonia-containing compound to the enclosed environment at the predetermined concentration for a predetermined duration, and curing the epoxy-containing prepreg assembly, wherein the prepreg in the enclosed environment is maintained at a substantially ambient temperature and at a substantially ambient pressure.

In a further aspect, the structure may be a stationary structure.

In another aspect, the stationary structure may or may not comprise moving components, such as buildings, generators, wind turbines, etc.

In yet another aspect, the structure may be a vehicle.

In a still further aspect, the vehicle may be a manned aircraft, an unmanned aircraft, a manned spacecraft, an unmanned spacecraft, a manned rotorcraft, an unmanned rotorcraft, a manned satellite, an unmanned satellite, a rocket, a manned terrestrial vehicle, an unmanned terrestrial vehicle, a manned surface and/or sub-surface water borne vehicle, an unmanned surface and/or sub-surface water borne vehicle and combinations thereof.

BRIEF DESCRIPTION OF THE DRAWINGS

Figure 1:
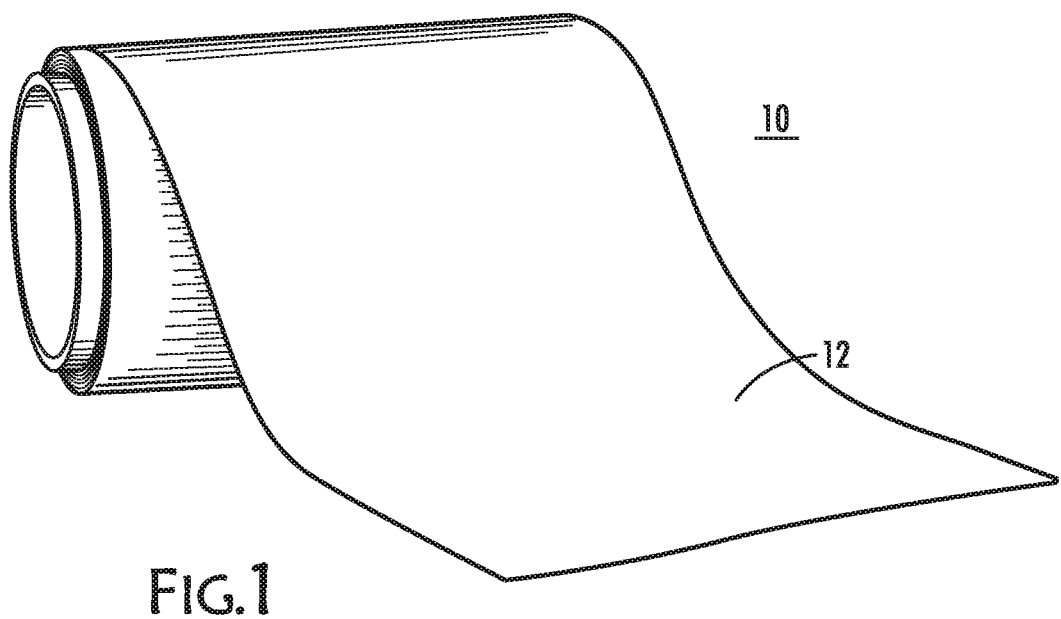
Figure 2:
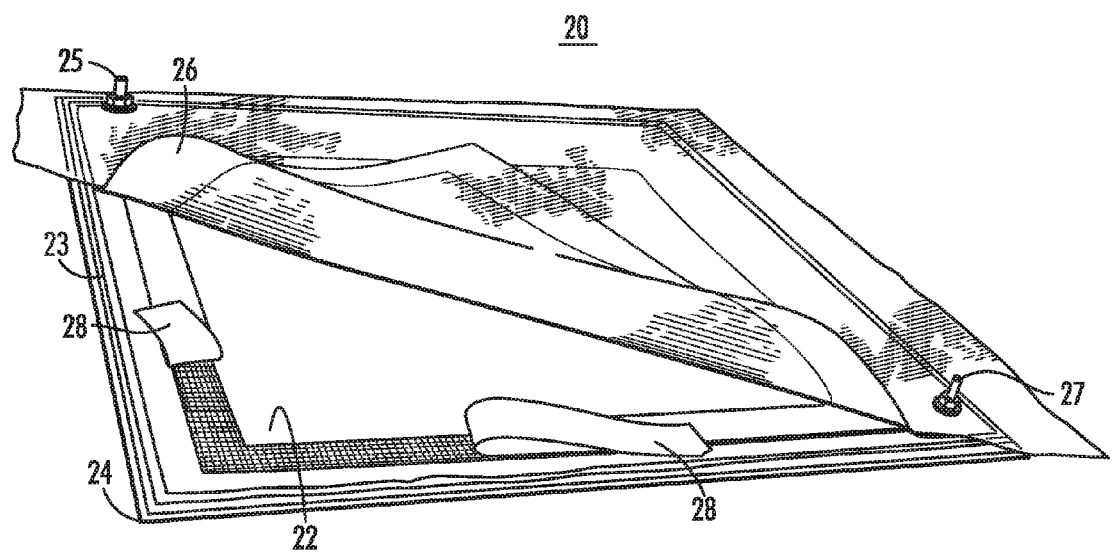
Figure 3:
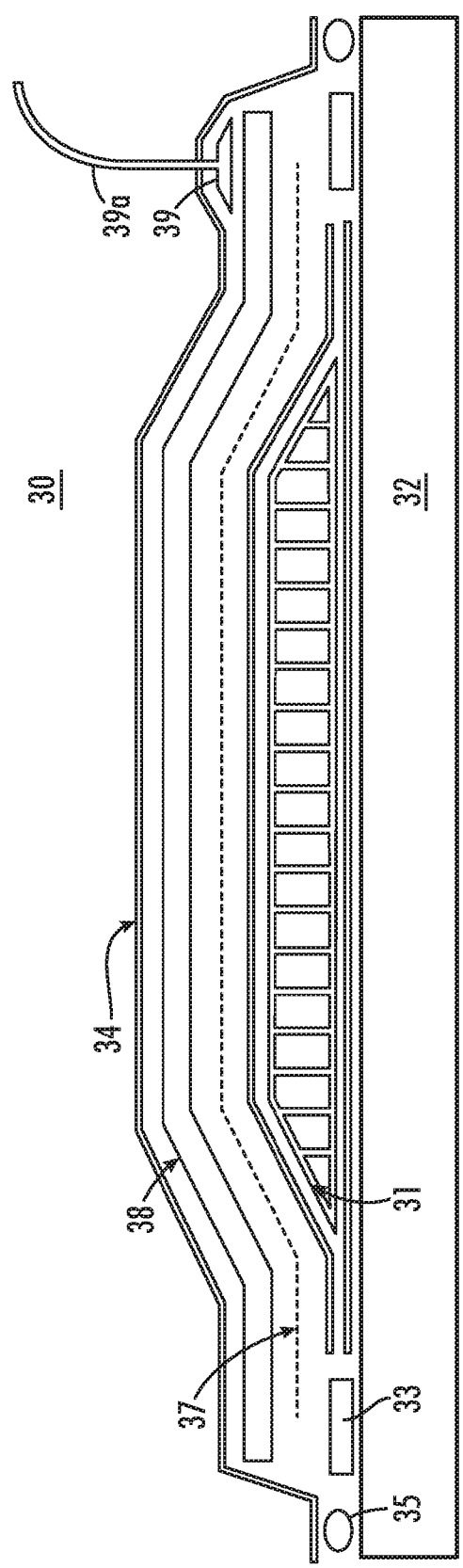
Figure 4:
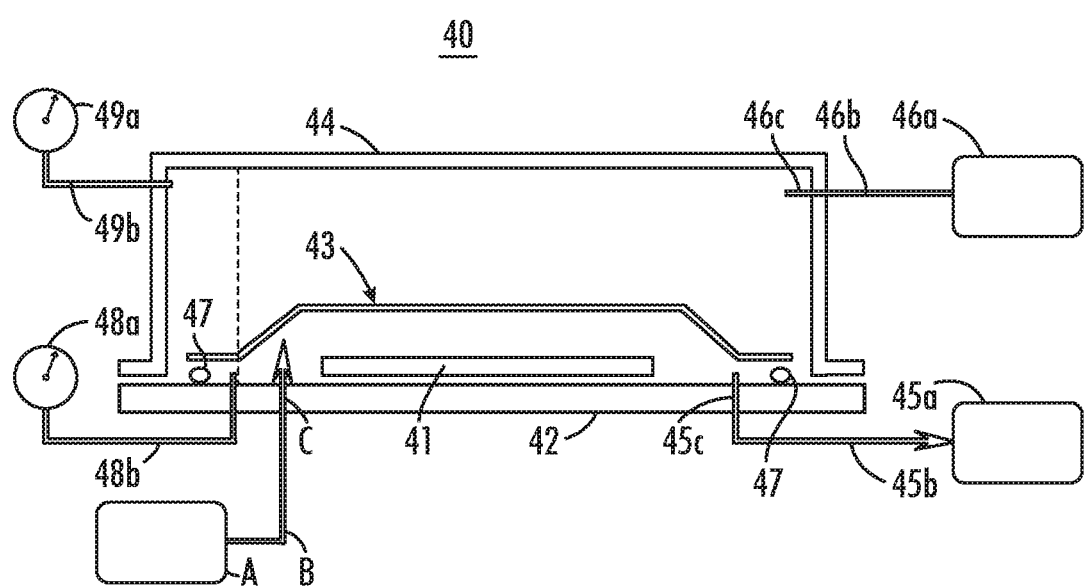
Figure 5:
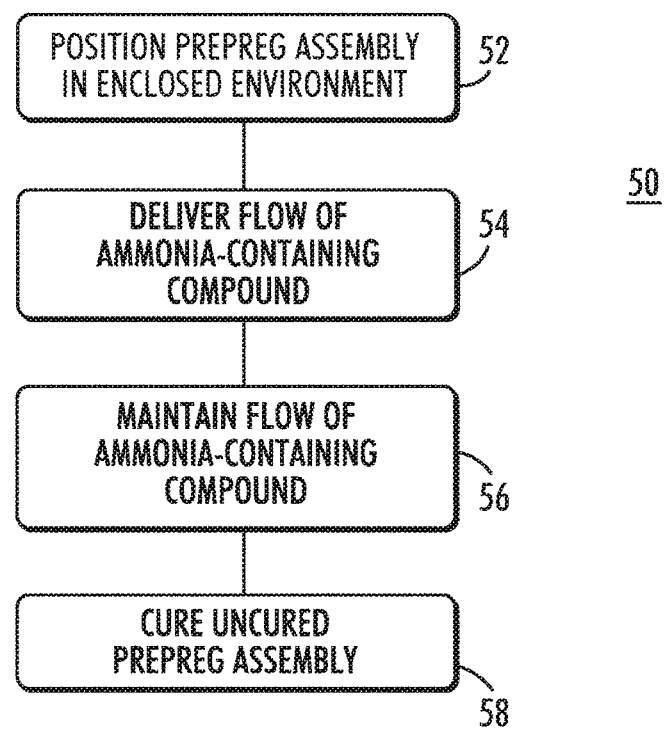
Figure 6A:
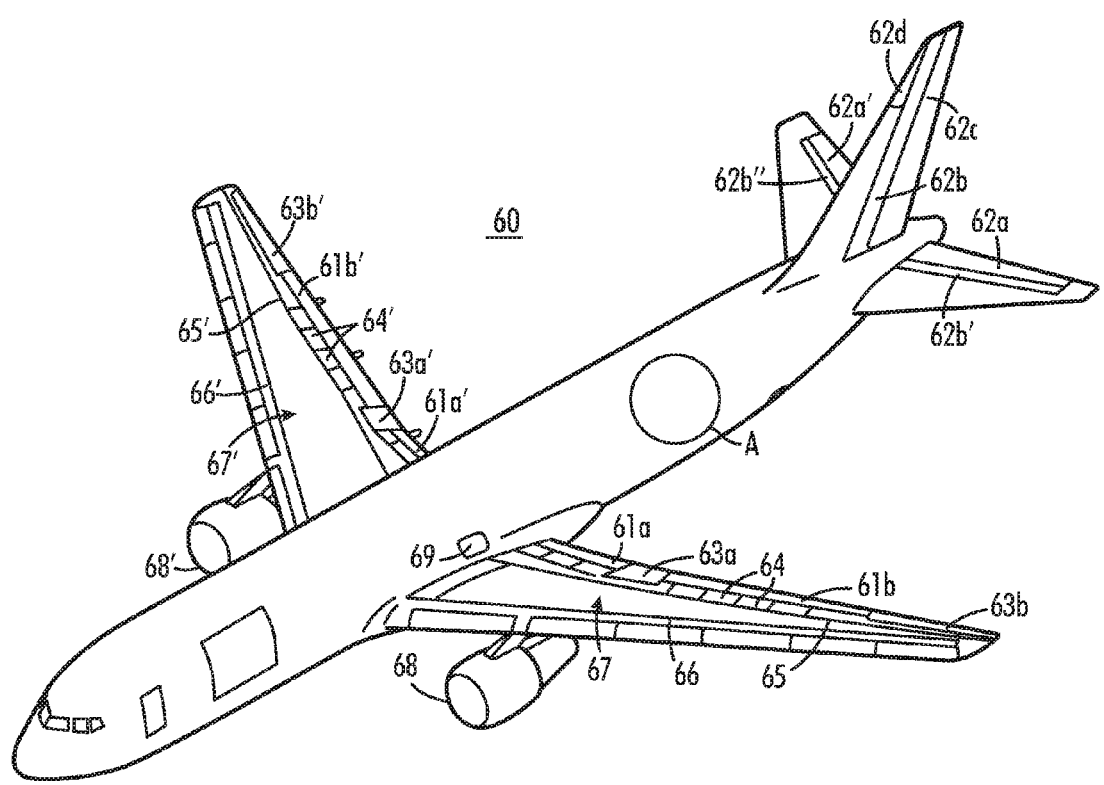
Figure 6B:
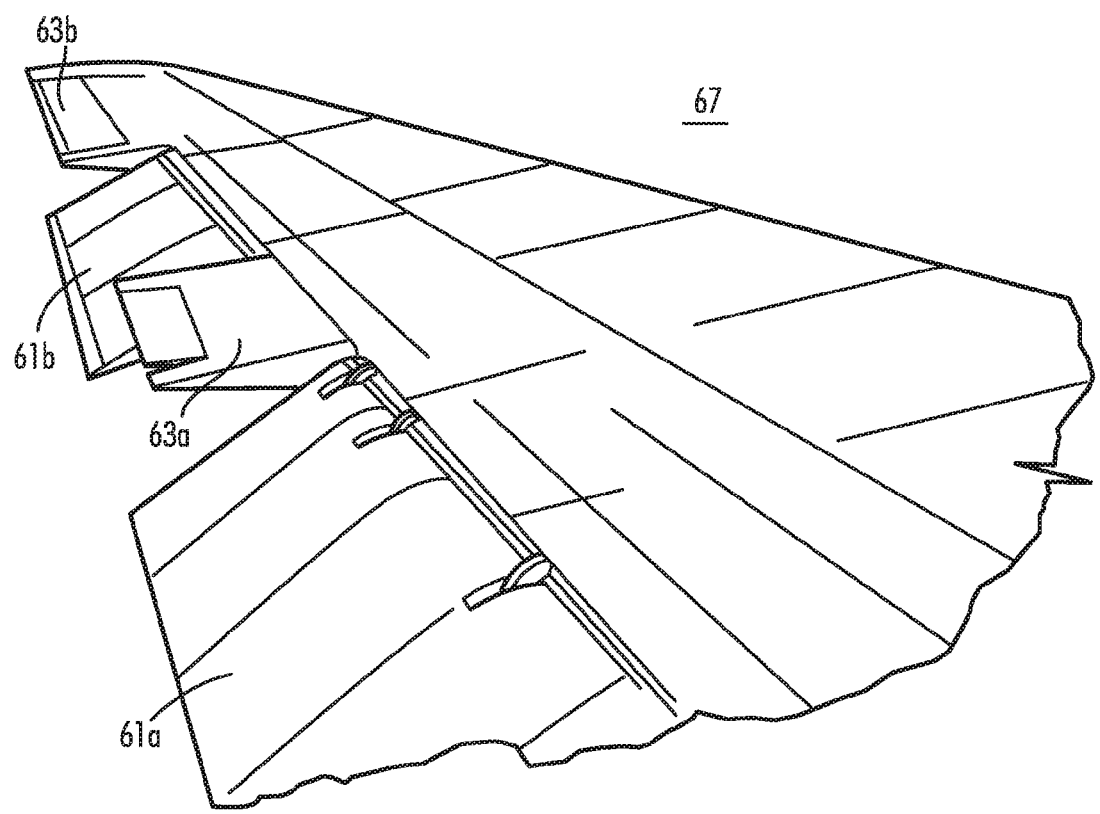
Figure 6C:
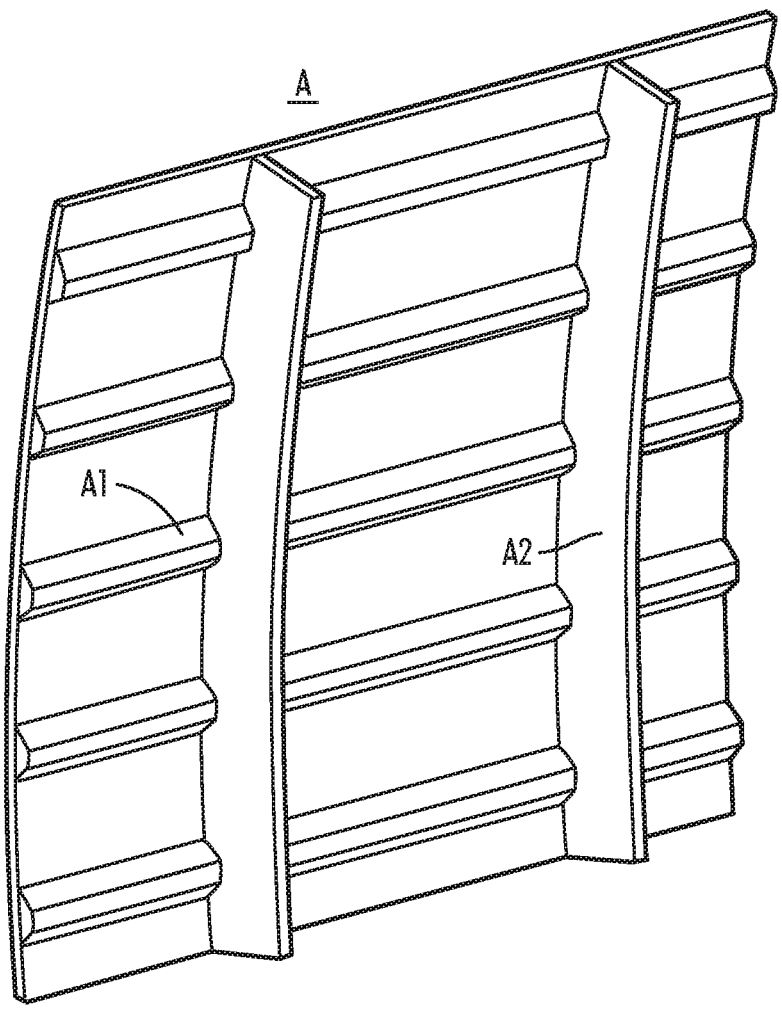

Having thus described variations of the disclosure in general terms, reference will now be made to the accompanying drawings, which are not necessarily drawn to scale, and wherein:

FIG. 1 is perspective view of a roll of epoxy-containing prepreg;

FIG. 2 is a perspective view of an epoxy-containing prepreg partially contained within an enclosed environment;

FIG. 3 is a side view of a shaped, epoxy-containing prepreg within an enclosed environment;

FIG. 4 is a side view of a variation showing an epoxy-containing prepreg within an enclosed environment;

FIG. 5 is a flowchart for one aspect of the present disclosure;

FIG. 6A is drawing of an aircraft comprising component parts made according to methods of the present disclosure;

FIG. 6B is a drawing showing an enlarged section of wing component parts of the aircraft of FIG. 6A; and FIG. 6C is a drawing of the interior of a fuselage panel A shown in FIG. 6A.

DETAILED DESCRIPTION

Aspects of the present disclosure are directed to methods and systems for curing an epoxy-containing prepreg at substantially ambient temperature and substantially ambient pressure by positioning the prepreg to be cured in an enclosed environment and delivering a flow of ammonia-containing compound to the enclosed environment to a predetermined concentration and maintaining the flow and concentration for a predetermined duration until the prepreg exhibits a desired and predetermined degree of cure. Therefore, aspects of the present disclosure contemplate a full and complete curing cycle for an epoxy-containing prepreg composite material without applying increased heat (above room temperature) or increased pressure (above ambient pressure).

According to the present specification "substantially ambient temperature" is defined as a room temperature, and is therefore understood to be a temperature ranging from about 60° F. to about 100° F. Further, according to the present specification "substantially ambient pressure" is defined as a naturally occurring pressure due to natural atmospheric conditions, varying accordingly to deviation from sea level and therefore having a value ranging from about 14 to about 16 psi.

The prepregs of the present disclosure are understood to be composite prepregs comprising a fiber component and an epoxy resin-containing component. Contemplated fibers for use in the composite prepreg include, without limitation, carbon fibers, glass fibers, aramid fibers, boron fibers, etc., and combinations thereof.

Contemplated epoxy resin-based compounds include, without limitation, digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate (and isocyanurates); glycerol diglycidyl ether; trimethylolpropane triglycidyl ether, or combinations thereof.

According to aspects of the present disclosure, the epoxy resin-containing prepreg material may be manufactured into a partially cured stated and stored in the partially cured state in rolls or sheets until ready to be laid up, for example, onto shaping mandrels. The partially cured epoxy resin-containing prepreg material may have a viscosity of from about 60,000 poise to about 1000 poise. Ideal prepreg candidate materials are fully impregnated materials where a resin substantially completely fills the fiber bed. Therefore, according to the present disclosure, the uncured epoxy resin containing prepreg may require the resin to be fully impregnated into the fiber bed to achieve proper cure after ammonia infusion.

FIG. 1 shows an uncured roll 10 of epoxy resin-containing prepreg material 12.

As shown in FIG. 2, an enclosed environment 20 encases a section of prepreg 22 laid up onto a tool (not shown as tool is covered by the prepreg 22). A lower section of the enclosed environment 24 is sealed to an upper section of the enclosed environment 26 via sealant means 23. Sealant means 23 is understood to include any sealant including sealant tapes, sealant compounds, etc. that may be designed for one time use, or that may be reusable. Resuable sealant means may include the use of substantially permanent rubber gaskets on predetermined areas on the upper section 26 and lower section 24 that may be designed to mate to facilitate repeated sealing during the curing process. Edge breather material 28 is shown surrounding the prepreg 22, although this feature is understood to be optional. Inlet port 25 and outlet port 27 are shown extending from upper section of the enclosed environment 24. In this way, when the upper section of the enclosed environment 26 is sealed to the lower section of the enclosed environment 24 via sealant means 23, with the inlet port 25 and outlet port 27 each providing communication between the contents (prepreg 22 on the tool) of the enclosed environment and the atmosphere outside of the enclosed environment. It is understood that a vacuum or other means to draw inlet gas out of the enclosure (not shown in FIG. 2) may be attached to the outlet port 27. According to one aspect, a source of ammonia-containing compound is provided from a container such as a tank with contents under pressure. Any non-limiting and suitable means of connecting the source to the input port 25, such as tubing, hose, etc. with connections as would be understood by one skilled in the field is contemplated. In this way a predetermined flow of ammonia-containing compound may be delivered to the enclosed environment.

The desired footprint and overall design of the enclosed environment is not critical, and aspects of the present disclosure therefore contemplate any dimension required to fabricate a particular composite part. If desired, and subject to observed safety standards, the enclosed environment may be a chamber of any dimension, or even a room or building, with suitable input for a source of ammonia-containing compound, and outlet for removal of contents of the enclosed environment as required to produce a flow of ammonia-containing compound over the prepreg being cured, while maintaining a desired low (ambient) pressure of the contents of the enclosed environment and conducting the entire curing cycle at ambient/room temperature.

FIG. 3 shows a side cross-sectional view of an enclosed environment 30 with a prepreg material 31 shown resting on a lower chamber surface 32, said lower chamber surface being a layup mold, if desired. An upper chamber surface 34 is adhered to the lower chamber surface 32 via sealant 35. Edge breathers or spacers 33 are shown surrounding the prepreg material 31. Parting film 37 is shown as a dotted line positioned between the prepreg material 36 and a surface breather layer 38. A vacuum vent line 39a is shown in communication with vacuum port 39

FIG. 4 shows a side view of an enclosed environment 40 with a prepreg material 41 positioned within to be cured. As shown in FIG. 4, the enclosed environment 40 is a chamber comprising a lower chamber section 42 sealed to an upper chamber section 43. As shown, the lower chamber section may be a layup mold. The prepreg material 41 is laid up on the lower chamber section 42. An outer shroud 44 is shown in communication with the lower chamber section 42. According to this variation, a first vacuum 45a is in communication with first vacuum line 45b. First vacuum line 45b is in communication with first vacuum port 45c. A second vacuum 46a is in communication with second vacuum line 45b that, in turn, is in communication with second vacuum port 46c. In this way, of desired, a vacuum may be introduced to the area containing the prepreg material 41 that is bounded by the lower chamber section 42 and the upper chamber section 43. If desired a vacuum may also be applied to the region bounded by the upper chamber section 43 and the outer shroud 44. Sealant 47 is shown adhering lower chamber section 42 to upper chamber section 43. A first vacuum gauge 48a is shown in communication with first vacuum gauge line 48b. Second vacuum gauge 49a is shown in communication with second vacuum gauge line 49b. An ammonia source "A" is in communication with ammonia source line "B" via ammonia source inlet "C".

According to a contemplated protocol according to an aspect of the present invention as shown in FIG. 4, a prepreg material on a layup tool maintained within a first chamber comprising the layup tool beneath and a vacuum film above. The vacuum bag may be made from any suitable material such as, without limitation, a nylon film. A first vacuum may be applied to the first chamber containing the prepreg material to be cured. An outer shroud then covers the vacuum film a distance above the vacuum film. According to an aspect of the present disclosure, a flow of ammonia-containing compound is then delivered to the first chamber to infuse the prepreg material with ammonia. The process is maintained at approximately room temperature for a predetermined time with no heat being added to the process (the curing process is not carried out at an elevated temperature for any amount of time). First vacuum pump may be activated to remove ammonia from the first chamber and to assist in maintaining a desired flow of ammonia at substantially ambient pressure or slightly elevated pressure, if desired. Second vacuum pump may be activated to control the pressure present between the outer shroud and the vacuum film (if desired).

FIG. 5 shows a contemplated variation according to the present disclosure, wherein, is a flow chart showing one aspect of the present disclosure. According to FIG. 5, a method for curing an epoxy-containing prepreg 50 comprises positioning an epoxy-containing prepreg in an enclosed environment 52, delivering a flow of an ammonia-containing compound to the enclosed environment 54, maintaining the flow of the ammonia-containing compound to the enclosed environment 56, and curing the epoxy-containing prepreg 48. It is understood that the entire method 50 is conducted at substantially ambient temperature and pressure.

The variations and alternatives of the present disclosure relate to the manufacture and use of components and parts such as, for example, composite component parts of any dimension, including the manufacture and use of components and parts in the fabrication of larger parts and structures. Such devices include, but are not limited to, components and parts designed to be positioned on the exterior or interior of stationary objects including, without limitation, bridge trusses, support columns, general construction object, etc. Further objects include, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

FIG. 6A is a drawing of an aircraft 60 showing a non-exhaustive catalog of various component parts that can be made using aspects of the methods and apparatuses disclosed herein to cure the various component parts made from cured epoxy resin-based materials cured according to methods of the present disclosure. FIG. 6B is an enlarged section of the port side wing 67 shown in FIG. 6A. As shown in FIG. 6A, such component parts include inboard flap wedge 61a, 61a'; outboard flap wedge, 61b, 61b'; ailerons 63a, 63a', 63b, 63b'; spoilers 64, 64'; elevators 62a, 62a'; upper fixed trailing edge panels 62b, 62b', 62b'', 65, 65', 66, 66'; engine cowls 68, 68'; and escape door 69. FIG. 6A shows also a fuselage section A. An interior view of fuselage section A is shown in FIG. 6C. As shown in FIG. 6C stringers A1 and frame members A2 also may be made according to methods set forth in the present disclosure.

When introducing elements of the present disclosure or exemplary aspects or embodiment(s) thereof, the articles "a," "an," "the" and "said" are intended to mean that there are one or more of the elements. The terms "comprising,"

"including" and "having" are intended to be inclusive and mean that there may be additional elements other than the listed elements. Although this disclosure has been described with respect to specific embodiments, the details of these embodiments are not to be construed as limitations. While the preferred variations and alternatives of the present disclosure have been illustrated and described, it will be appreciated that various changes and substitutions can be made therein without departing from the spirit and scope of the disclosure.

We claim:

1. A method for curing an epoxy-containing prepreg assembly for a composite material comprising:
   positioning the epoxy-containing prepreg assembly for a composite material, in an enclosed environment, said enclosed environment comprising an inlet, said prepreg assembly comprising layers of prepregs, said layers of prepregs comprising fibers, said fibers selected from the group consisting of: carbon fibers, glass fibers, aramid fibers, boron fibers and combinations thereof;
   delivering a flow of an ammonia-containing compound to the enclosed environment via the inlet, said flow delivered to the enclosed environment to a predetermined concentration;
   maintaining the flow of the ammonia-containing compound to the enclosed environment at the predetermined concentration for a predetermined duration; and
   curing the epoxy-containing prepreg assembly to produce the composite material;
   wherein the prepreg assembly in the enclosed environment is maintained at a temperature ranging from about 60° F. to about 100° F. and at a pressure ranging from about 14 psi to about 16 psi.

2. The method of claim 1, wherein the ammonia-containing compound is delivered to the enclosed environment in a gaseous state.

3. The method of claim 1, wherein the ammonia-containing compound is delivered to the enclosed environment as a vapor.

4. The method of claim 1, wherein the epoxy-containing prepreg assembly comprises an epoxy-containing compound selected from the group consisting of: digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

5. The method of claim 1, wherein the enclosed environment further comprises an outlet.

6. The method of claim 5, wherein the outlet is in communication with a vacuum.

7. The method of claim 1, wherein the epoxy-containing prepreg assembly has a viscosity ranging from about 60,000 poise to about 1000 poise.

8. The method of claim 1, wherein the ammonia-containing compound is substantially pure ammonia.

9. A cured epoxy-containing prepreg assembly made according to the method of claim 1.

10. A structure comprising the epoxy-containing prepreg assembly of claim 9.

11. A vehicle comprising the epoxy-containing prepreg assembly of claim 9.

12. The vehicle of claim 11, wherein the vehicle is selected from the group consisting of: a manned, and unmanned aircraft, a manned spacecraft, an unmanned spacecraft, a manned rotorcraft, an unmanned rotorcraft, a rocket, a manned satellite, an unmanned satellite, a manned terrestrial vehicle, an unmanned terrestrial vehicle, a manned surface and/or sub-surface water borne vehicle, an unmanned surface and/or sub-surface waterborne vehicle, and combinations thereof.

13. A system for curing an epoxy-containing prepreg assembly for a composite material, said system comprising:
   an epoxy-containing prepreg assembly for a composite material, said prepreg assembly comprising layers of prepregs, said layers of prepregs comprising fibers, said fibers selected from the group consisting of: carbon fibers, glass fibers, aramid fibers, boron fibers and combinations thereof;
   an enclosed environment dimensioned to house the epoxy-containing prepreg assembly, said enclosed environment comprising an inlet; and
   an amount of an ammonia-containing compound delivered to the enclosed environment to a predetermined concentration via the inlet;
   wherein the ammonia-containing compound cures the epoxy-containing prepreg assembly to produce the composite material at a temperature ranging from about 60° F. to about 100° F. and at a pressure ranging from about 14 psi to about 16 psi.

14. The system of claim 13, wherein the ammonia-containing compound is delivered to the enclosed environment in a gaseous state.

15. The system of claim 13, wherein the epoxy-containing prepreg assembly comprises an epoxy-containing compound selected from the group consisting of: digylcidyl ethers of bisphenol A; dicgycidyl ethers of bisphenol F; N,N,N',N'-tetragylcidyl-4,4'-diaminophenylmethane; p-amino phenol triglycidyl ether; epoxy phenol novolac resins; epoxy cresol novolac resins; 1,3,5-triglycidyl isocyanurate; tris(2,3-epoxypropyl)isocyanurate; glycerol diglycidyl ether; trimethylolpropane triglycidyl ether, and combinations thereof.

16. The system of claim 13, wherein the enclosed environment further comprises an outlet.

17. The system of claim 16, wherein the outlet is in communication with a vacuum.

18. The system of claim 13, wherein the ammonia-containing compound is substantially pure ammonia.

* * * * *